United States Patent
Lee (10) Patent No.: US 9,325,199 B2
(45) Date of Patent: Apr. 26, 2016

(54) WIRELESS CHARGING DEVICE

(71) Applicant: LIEN CHANG ELECTRONIC ENTERPRISE CO., LTD., Taipei (TW)

(72) Inventor: Hsueh-Han Lee, Taipei (TW)

(73) Assignee: LIEN CHANG ELECTRONIC ENTERPRISE CO., LTD., Taipei (TW)

( * ) Notice: Subject to any disclaimer, the term of this patent is extended or adjusted under 35 U.S.C. 154(b) by 159 days.

(21) Appl. No.: 14/220,216

(22) Filed: Mar. 20, 2014

(65) Prior Publication Data

US 2015/0188353 A1 Jul. 2, 2015

(30) Foreign Application Priority Data

Dec. 31, 2013 (TW) ............................ 102149255 A (51) Int. Cl.
*H02J 7/00* (2006.01)
*H04B 1/38* (2015.01)
*H04M 1/00* (2006.01)
*H02J 7/02* (2006.01)
*H04M 1/02* (2006.01)

(52) U.S. Cl.
CPC ............... *H02J 7/025* (2013.01); *H02J 7/0044* (2013.01); *H04M 1/0214* (2013.01); *H02J 7/0042* (2013.01)

(58) Field of Classification Search
CPC ................................ H02J 7/0044; H02J 7/025
USPC ................ 320/108, 107; 455/41.1, 572, 573, 455/575.1
See application file for complete search history.

(56) References Cited

U.S. PATENT DOCUMENTS

| | | | |
|---|---|---|---|
| 8,215,187 B2 * | 7/2012 | Chen | B25B 23/1425 73/862.21 |
| 2007/0049241 A1 * | 3/2007 | Shih | H04B 1/202 455/352 |
| 2007/0063669 A1 * | 3/2007 | Keating | H02J 7/0054 320/107 |
| 2009/0302799 A1 | 12/2009 | Marquet et al. | |
| 2010/0328044 A1 * | 12/2010 | Waffenschmidt | H02J 7/025 340/10.4 |
| 2011/0241615 A1 | 10/2011 | Yeh | |

(Continued)

FOREIGN PATENT DOCUMENTS

| | | |
|---|---|---|
| CN | 203119575 U | 8/2013 |
| TW | 201230585 A1 | 7/2012 |

OTHER PUBLICATIONS

European Patent Office, European Patent Search Report issued on May 11, 2015.

*Primary Examiner* — M'Baye Diao
(74) *Attorney, Agent, or Firm* — Li & Cai Intellectual Property (USA) Office (57) ABSTRACT

A wireless charging device includes a wireless transmitting module and a wireless receiving module. The wireless transmitting module includes a first outer casing and a wireless transmitting unit disposed inside the first outer casing for generating electromagnetic fields. The wireless receiving module includes a second outer casing, a wireless receiving unit disposed inside the second outer casing for wirelessly receiving the electromagnetic fields generated by the wireless transmitting unit, and at least one electrical connector exposed outside the second outer casing and electrically contacting a portable electronic device. The first outer casing of the wireless transmitting module has at least one first receiving space for receiving the second outer casing and at least one second receiving space for receiving the at least one electrical connector.

9 Claims, 11 Drawing Sheets

(56) References Cited

U.S. PATENT DOCUMENTS

| | | | |
|---|---|---|---|
| 2012/0098484 A1* | 4/2012 | Cheng | H01F 38/14 320/108 |
| 2012/0169276 A1 | 7/2012 | Wang et al. | |
| 2012/0217925 A1 | 8/2012 | Cheng et al. | |
| 2013/0154552 A1* | 6/2013 | Siessegger | H02J 7/0047 320/108 |
| 2013/0162200 A1* | 6/2013 | Terry | H02J 5/005 320/108 |
| 2013/0260677 A1* | 10/2013 | Partovi | H01F 5/003 455/41.1 |
| 2014/0132206 A1* | 5/2014 | Zhu | H02J 7/025 320/108 |
| 2014/0139179 A1* | 5/2014 | Chen | H02J 7/025 320/108 |
| 2014/0253024 A1* | 9/2014 | Rautiainen | H02J 7/025 320/108 |
| 2014/0333254 A1* | 11/2014 | Teng | H02J 7/025 320/108 |

* cited by examiner

WIRELESS CHARGING DEVICE

BACKGROUND OF THE INVENTION

1. Field of the Invention

The instant disclosure relates to a wireless charging device, and more particularly to a wireless charging device with storage function.

2. Description of Related Art

With the continuous progress of technology and science, the demand for electronic devices by general consumers is increasingly upgraded, especially for consumer electronic products. Electronic devices, which were bulky in size, such as optic disk players, household telephones, and desk-top computers, are being changed to compact and portable electronic products of high performance, such as multimedia player (for example MPEG Audio Layer-3, MP3), mobile phones, and notebook computers, all leading to a more efficient life for human beings.

Most of such portable electronic products, including the multimedia players and mobile phones, are powered by rechargeable batteries or cells, such as nickel hydride battery and lithium battery. The rechargeable battery is rechargeable through a charging device or charger, which is composed of a charging seat and an electrical connector. The charging seat forms a charging chamber in which the rechargeable battery is positioned, while the electrical connector is set in connection with a power socket, such as a wall outlet to supply a required voltage or current to charge the rechargeable battery. On the other hand, the electronic device, such as notebook computer, is provided with an adaptor that is electrically connectable with the wall outlet, whereby the adaptor that receives electrical power from the wall outlet supplies a required voltage or current to the notebook computer. Since the portable electronic products must be powered through the adaptor or by a rechargeable battery, those who attempt to carry these products outdoors must also carry various adaptors or chargers. This is very inconvenient for the users of the products and makes the use inconvenient. Further, the charging device or the adaptor must use connection wires to transmit electrical power for charging the rechargeable battery. This limits the range where the charging device or the adaptor is useful.

SUMMARY OF THE INVENTION

One aspect of the instant disclosure relates to a wireless charging device with storage function.

One of the embodiments of the instant disclosure provides a wireless charging device, comprising: a wireless transmitting module and a wireless receiving module. The wireless transmitting module includes a first outer casing, an power storage unit disposed inside the first outer casing, a first control circuit unit disposed inside the first outer casing and electrically connected to the power storage unit, and a wireless transmitting unit disposed inside the first outer casing and electrically connected to the first control circuit unit for generating electromagnetic fields. The wireless receiving module includes a second outer casing, a wireless receiving unit disposed inside the second outer casing for wirelessly receiving the electromagnetic fields generated by the wireless transmitting unit, a second control circuit unit disposed inside the second outer casing and electrically connected to the wireless receiving unit, and at least one electrical connector exposed outside the second outer casing and electrically connected between the second control circuit unit and a portable electronic device. Wherein, the first outer casing of the wireless transmitting module has at least one first receiving space corresponding to the second outer casing and at least one second receiving space corresponding to the at least one electrical connector, and the wireless receiving module includes a support unit connected to the second outer casing for supporting the at least one electrical connector.

Another one of the embodiments of the instant disclosure provides a wireless charging device, comprising: a wireless transmitting module and a wireless receiving module. The wireless transmitting module includes a first outer casing and a wireless transmitting unit disposed inside the first outer casing for generating electromagnetic fields. The wireless receiving module includes a second outer casing, a wireless receiving unit disposed inside the second outer casing for wirelessly receiving the electromagnetic fields generated by the wireless transmitting unit, and at least one electrical connector exposed outside the second outer casing and electrically contacting a portable electronic device. Wherein, the first outer casing of the wireless transmitting module has at least one first receiving space for receiving the second outer casing and at least one second receiving space for receiving the at least one electrical connector.

Yet another one of the embodiments of the instant disclosure provides a wireless charging device, comprising: a wireless transmitting module and a wireless receiving module. The wireless transmitting module includes a first outer casing, an power storage unit disposed inside the first outer casing, a first control circuit unit disposed inside the first outer casing and electrically connected to the power storage unit, and a wireless transmitting unit disposed inside the first outer casing and electrically connected to the first control circuit unit for generating electromagnetic fields. The wireless receiving module includes a second outer casing, a wireless receiving unit disposed inside the second outer casing for wirelessly receiving the electromagnetic fields generated by the wireless transmitting unit, a second control circuit unit disposed inside the second outer casing and electrically connected to the wireless receiving unit, and at least one electrical connector exposed outside the second outer casing and electrically connected between the second control circuit unit and a portable electronic device. Wherein, the wireless receiving module includes a support unit connected to the second outer casing for supporting the at least one electrical connector, the wireless receiving module is totally received inside the first outer casing of the wireless transmitting module except an exposed lateral side of the support unit, and the exposed lateral side of the support unit is substantially flushed with outer surface of the first outer casing.

More precisely, the first outer casing has a placing platform for carrying the wireless receiving module and a non-slip structure opposite to the placing platform, and both the at least one first receiving space and the at least one second receiving space are formed on the same lateral side of the first outer casing, wherein the wireless transmitting module includes a transformer disposed inside the first outer casing and electrically connected to the power storage unit, a power input unit electrically connected to the transformer, and at least one power output unit electrically connected to the power storage unit.

More precisely, the second outer casing has a first opening communicated with the at least one first receiving space and a second opening communicated with the at least one second receiving space, and the first opening and the second opening are separated from each other or communicated with each other, wherein the at least one first receiving space and the at least one second receiving space are separated from each other or communicated with each other, the second outer casing is received inside the at least one first receiving space of the first outer casing through the at least one first opening, and the at least one electrical connector is received inside the at least one second receiving space of the first outer casing through the at least one second opening.

More precisely, the support unit has a support body connected to the second outer casing for fixing the height of the at least one electrical connector relative to the second outer casing and a pull ring connected to the support body and opposite to the at least one electrical connector.

More precisely, the support unit has a support body connected to the second outer casing, an inbuilt height adjusting mechanism disposed inside the support body for adjusting the height of the at least one electrical connector relative to the second outer casing, and a pull ring connected to the support body and opposite to the at least one electrical connector, and the inbuilt height adjusting mechanism includes an elastic element for abutting against an embedded portion of the at least one electrical connector and a lifting and lowering shaft connected to the embedded portion of the at least one electrical connector for adjusting the compression deformation of the elastic element.

More precisely, the first outer casing has a first retaining structure disposed inside the at least one first receiving space, the second outer casing has a second retaining structure corresponding to the first retaining structure, and the first outer casing and the at least one electrical connector are respectively retained inside the at least one first receiving space and the at least one second receiving space by matching the first retaining structure and the second retaining structure.

Therefore, the aspect of the wireless charging device is increased due to the design of "the first outer casing of the wireless transmitting module has at least one first receiving space corresponding to the second outer casing and at least one second receiving space corresponding to the at least one electrical connector" or "the wireless receiving module is totally received inside the first outer casing of the wireless transmitting module except an exposed lateral side of the support unit".

To further understand the techniques, means and effects of the instant disclosure applied for achieving the prescribed objectives, the following detailed descriptions and appended drawings are hereby referred, such that, through which, the purposes, features and aspects of the instant disclosure can be thoroughly and concretely appreciated. However, the appended drawings are provided solely for reference and illustration, without any intention to limit the instant disclosure.

DETAILED DESCRIPTION OF THE PREFERRED EMBODIMENTS

Referring to FIG. 1 to FIG. 6, the instant disclosure provides a wireless charging device with storage function, comprising: a wireless transmitting module 1 and a wireless receiving module 2.

First, referring to FIG. 1 to FIG. 4, the wireless transmitting module 1 includes a first outer casing 10, an power storage unit 11 disposed inside the first outer casing 10, a first control circuit unit 12 disposed inside the first outer casing 10 and electrically connected to the power storage unit 11, and a wireless transmitting unit 13 disposed inside the first outer casing 10 and electrically connected to the first control circuit unit 12 for generating electromagnetic fields or electromagnetic signals. More precisely, the first outer casing 10 has a placing platform 103 for carrying or supporting the wireless receiving module 2 and a non-slip structure 104 opposite to the placing platform 103, and the placing platform 103 and the non-slip structure 104 are respectively disposed on two opposite surfaces of the first outer casing 10. In addition, the wireless transmitting module 1 further includes a transformer 14 disposed inside the first outer casing 10 and electrically connected to the power storage unit 11, a power input unit 15 electrically connected to the transformer 14, and at least one power output unit 16 electrically connected to the power storage unit 11. For instance, referring to FIG. 3 and FIG. 4, when the power transmission line W1 having a 8-shaped plug, a USB plug or any type of plug is electrically connected to the power input unit 15 having a 8-shaped socket, a USB socket or any type of socket, the power source can sequentially pass through the power transmission line W1, the power input unit 15 and the transformer 14 to charge up the power storage unit 11, thus the wireless transmitting module 1 can be used as a power supply. Of course, the transformer 14 can be omitted from the wireless transmitting module 1, so that the power input unit 15 can be electrically connected to the power storage unit 11 directly.

Figure 1:
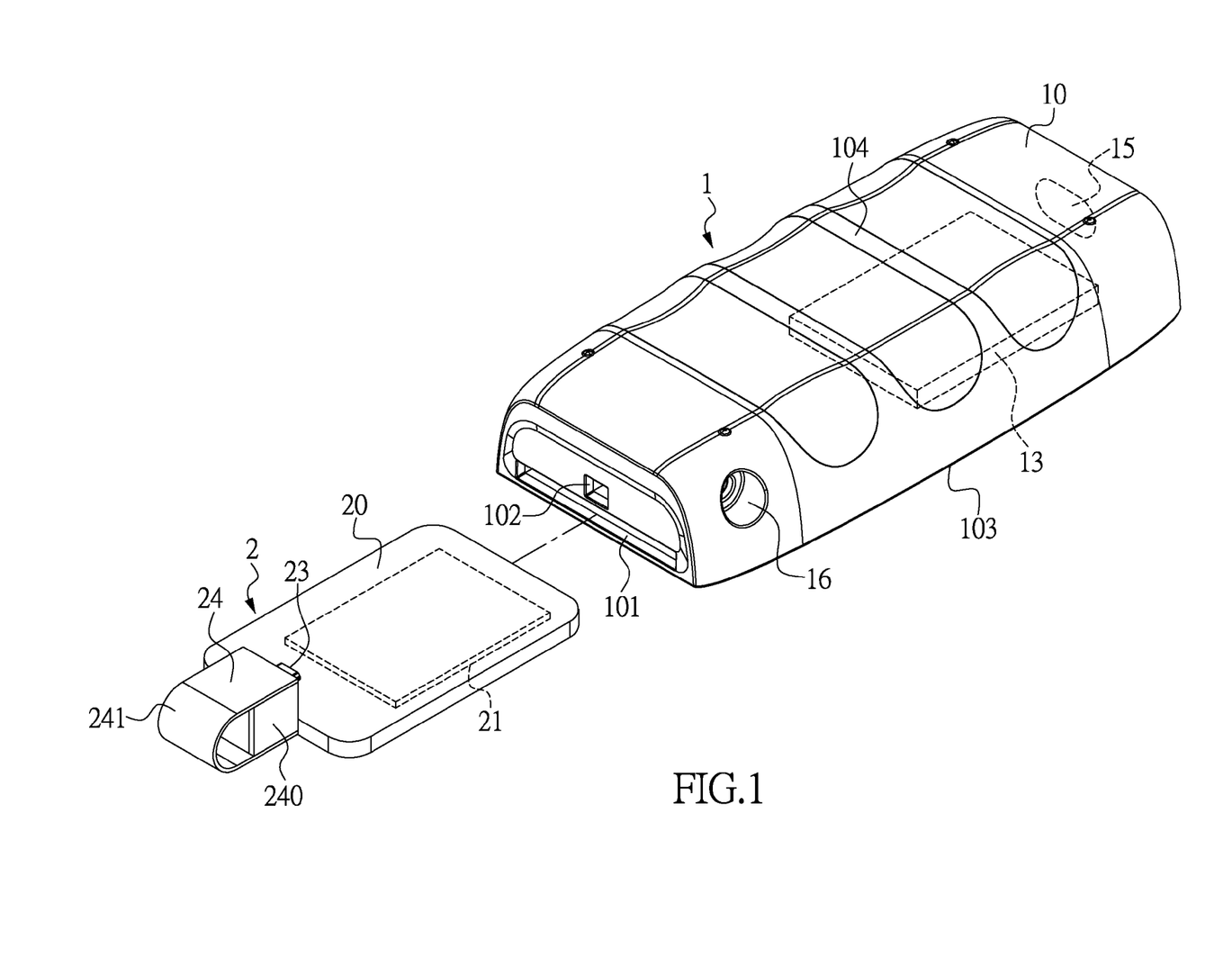
FIG. 1 shows a perspective, exploded, schematic view of the wireless charging device according to the instant disclosure.
Figure 2:
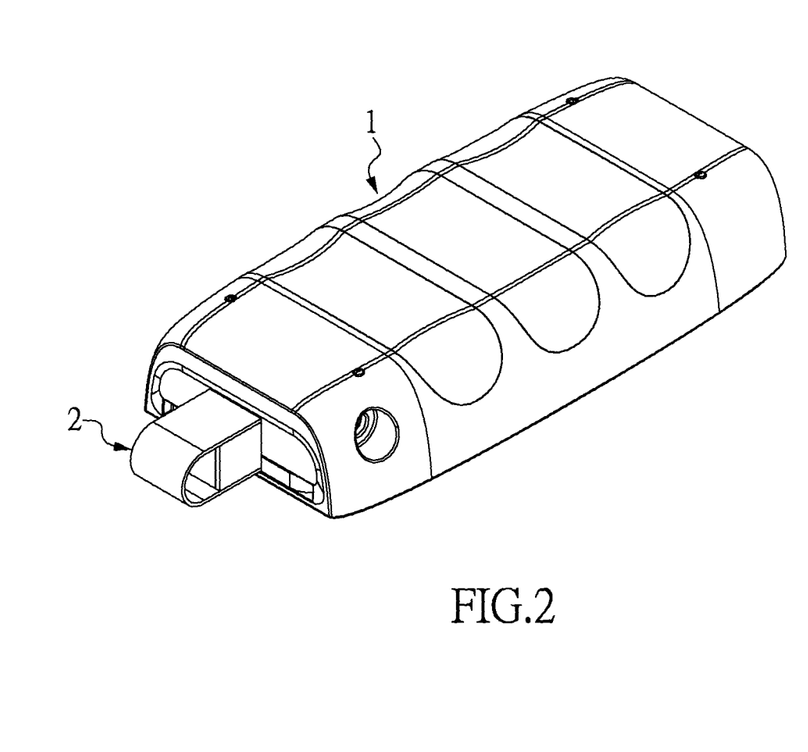
FIG. 2 shows a perspective, assembled, schematic view of the wireless charging device according to the instant disclosure.
Figure 3:
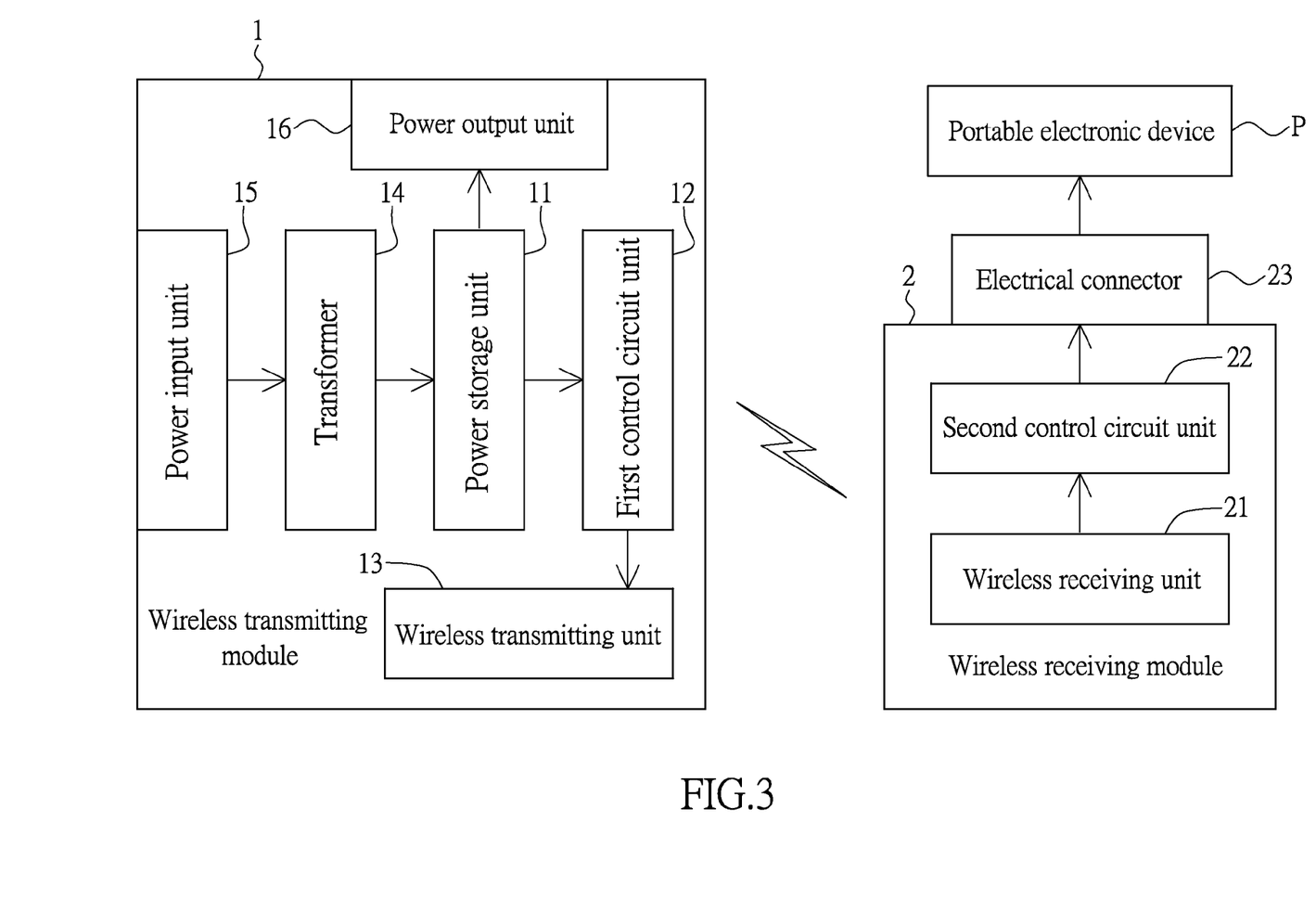
FIG. 3 shows a function block diagram of the wireless charging device according to the instant disclosure.
Figure 4:
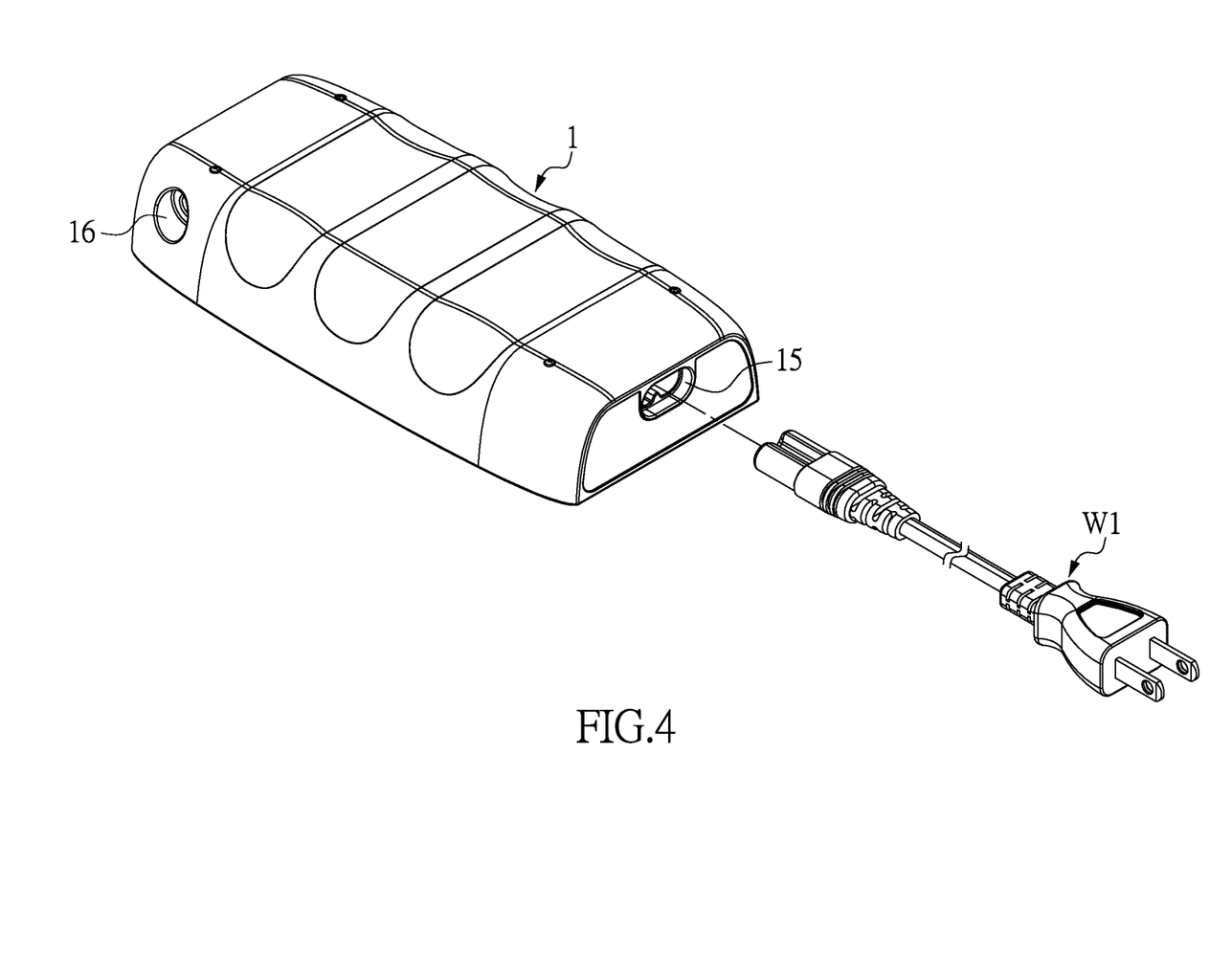
FIG. 4 shows a perspective, schematic view of preparing to charge up the wireless charging device according to the instant disclosure.

Moreover, referring to FIG. 1 to FIG. 3, the wireless receiving module 2 includes a second outer casing 20, a wireless receiving unit 21 disposed inside the second outer casing 20 for wirelessly receiving the electromagnetic fields generated by the wireless transmitting unit 13, a second control circuit unit 22 disposed inside the second outer casing 20 and electrically connected to the wireless receiving unit 21, and at least one electrical connector 23 exposed outside or from the second outer casing 20 and electrically connected between the second control circuit unit 22 and a portable electronic device P (such as a mobile phone). More precisely, the wireless receiving module 2 further includes a support unit 24 connected to the second outer casing 20 for supporting the at least one electrical connector 23. In addition, the support unit 24 has a support body 240 connected to the second outer casing 20 for fixing the height of the at least one electrical connector 23 relative to the second outer casing 20 and a pull ring 241 connected to the support body 240 and opposite to the at least one electrical connector 23, and the pull ring 241 is provided for the user to hold it.

Figure 5:
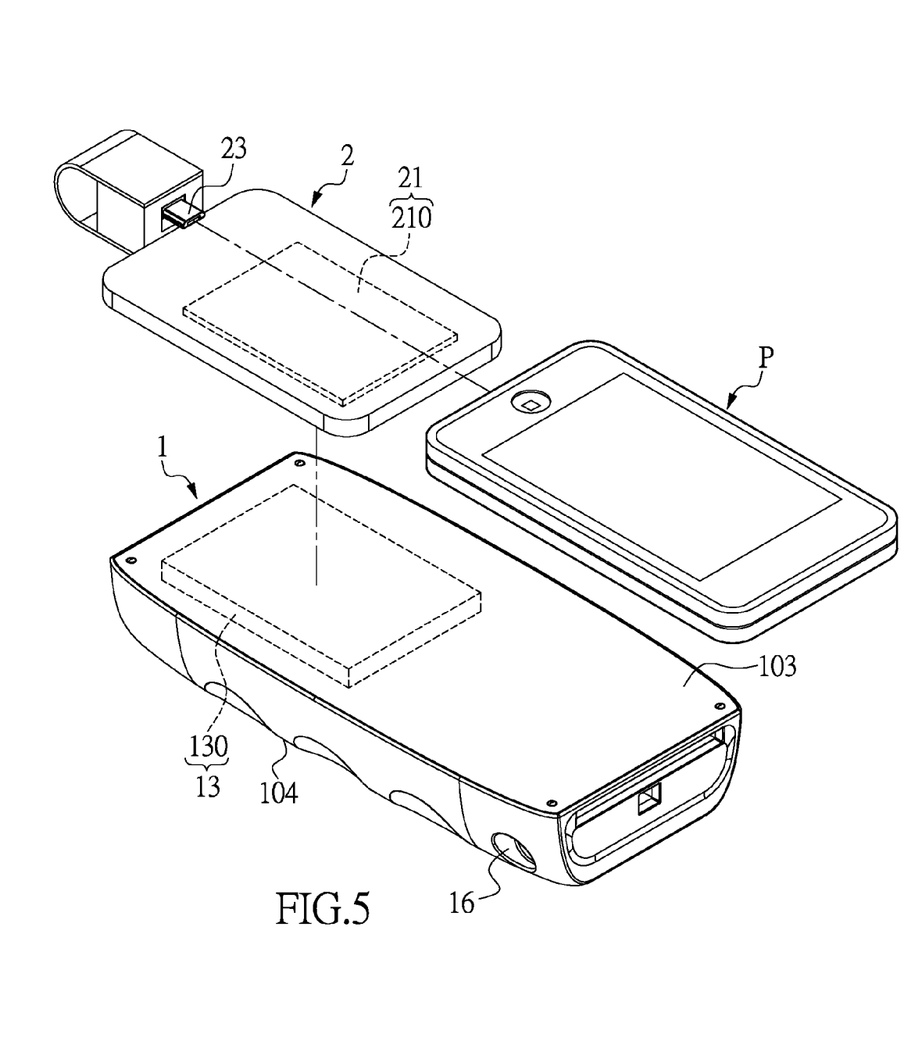
FIG. 5 shows a perspective, schematic view of preparing to charge up the portable electronic device according to the instant disclosure.
Figure 6:
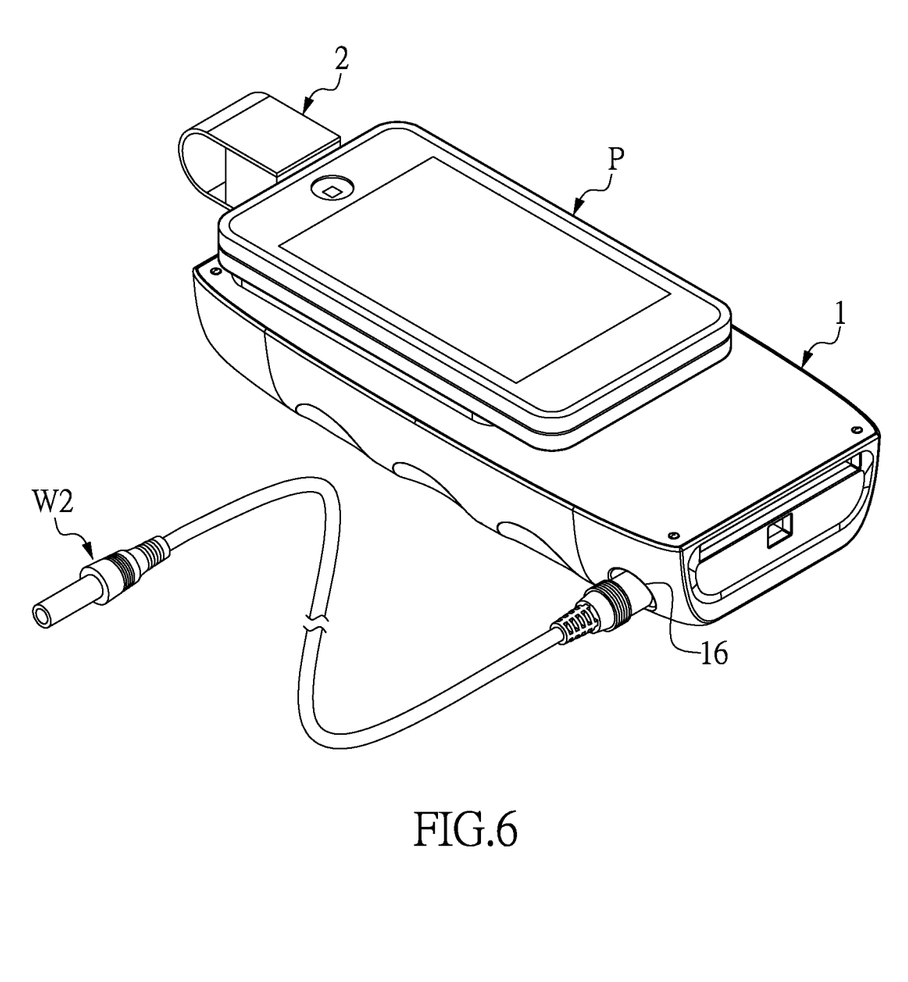
FIG. 6 shows a perspective, schematic view of charging up the portable electronic device according to the instant disclosure.

Furthermore, referring to FIG. 3, FIG. 5 and FIG. 6, when the wireless transmitting module 1 is overturned by 180 degrees, the wireless transmitting module 1 can be firmly placed on any plane through the non-slip structure 104. After inserting the at least one electrical connector 23 of the wireless receiving module 2 into the USB socket (not shown) of the portable electronic device P for electrically connecting the at least one electrical connector 23 with the portable electronic device P, the portable electronic device P can be placed on the placing platform 103 of the first outer casing 10 as shown in FIG. 6. Whereby, when AC (Alternating Current) power source generated by the power storage unit 11 is transmitted to the wireless transmitting unit 13 through the first control circuit unit 12, the transmitting coil 130 of the wireless transmitting unit 13 can generate AC (alternating Current) electromagnetic field through the AC power source. When the AC electromagnetic field generated from the transmitting coil 130 of the wireless transmitting unit 13 is wirelessly received by the receiving coil 210 of the wireless receiving unit 21, the AC electromagnetic field can be transformed into an electrical energy through the second control circuit unit 22, and then the electrical energy can be transmitted to the portable electronic device P to charge up the portable electronic device P through the at least one electrical connector 23.

It is worth mentioning that referring to FIG. 6, when the wireless transmitting module 1 and the wireless receiving module 2 are mated with each other to charge up the portable electronic device P, the wireless transmitting module 1 can be used as a power supply to charge up another portable electronic device (such as a notebook or another mobile phone, not shown) by matching the at least one power output unit 16 (such as a DC jack, a USB socket or any type of socket) and another power transmission line W1.

Figure 7:
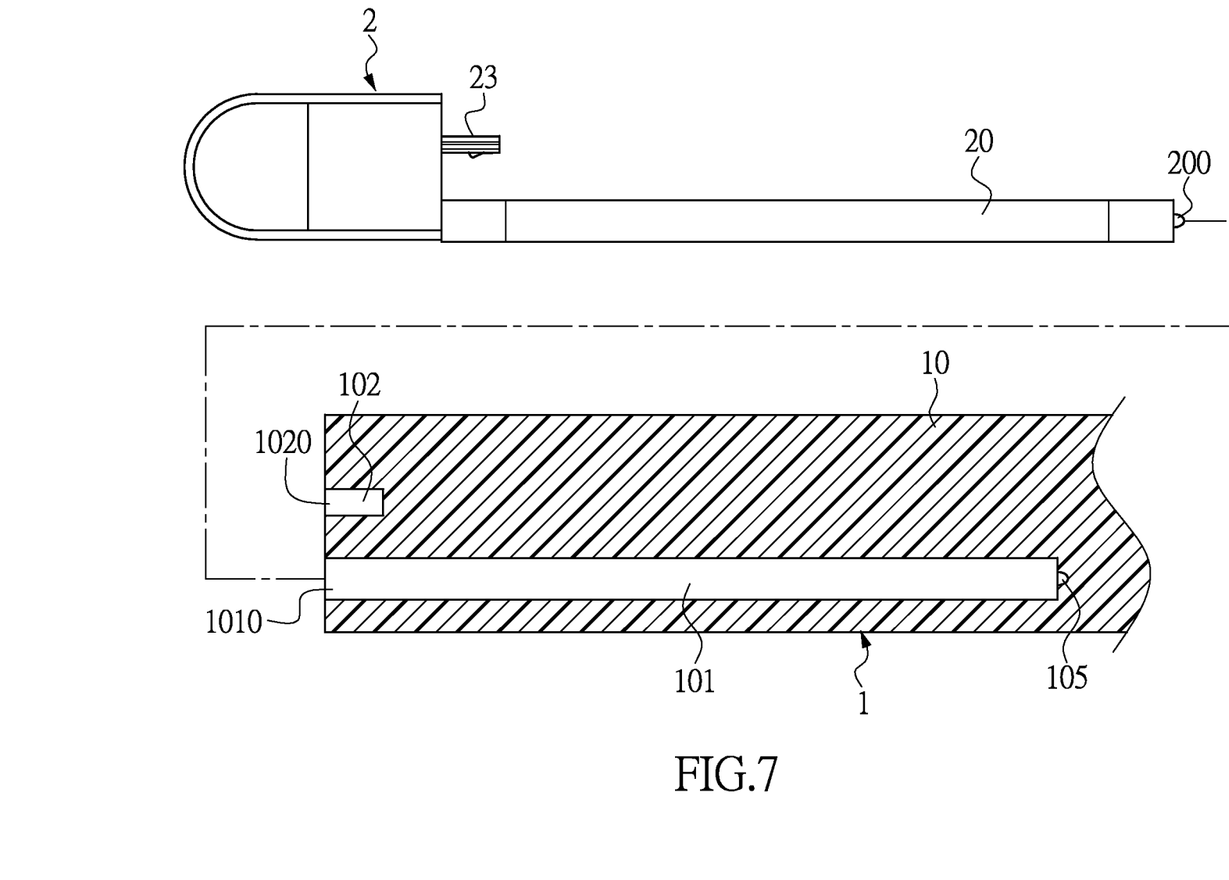
FIG. 7 shows a lateral, cross-sectional, schematic view of preparing to receive the wireless receiving module inside one type of the first outer casing according to the instant disclosure.

Besides, referring to FIG. 1, FIG. 2 and FIG. 7, the first outer casing 10 of the wireless transmitting module 1 has at least one first receiving space 101 corresponding to the second outer casing 20 and at least one second receiving space 102 corresponding to the at least one electrical connector 23, and both the at least one first receiving space 101 and the at least one second receiving space 102 are formed on the same lateral side of the first outer casing 10. More precisely, the second outer casing 20 has a first opening 1010 communicated with the at least one first receiving space 101 and a second opening 1020 communicated with the at least one second receiving space 102. Whereby, when the user want to store the wireless receiving module 2 in the wireless transmitting module 1, the second outer casing 20 can be received inside the at least one first receiving space 101 of the first outer casing 10 through the at least one first opening 1010, and the at least one electrical connector 23 can be received inside the at least one second receiving space 102 of the first outer casing 10 through the at least one second opening 1020.

Figure 8:
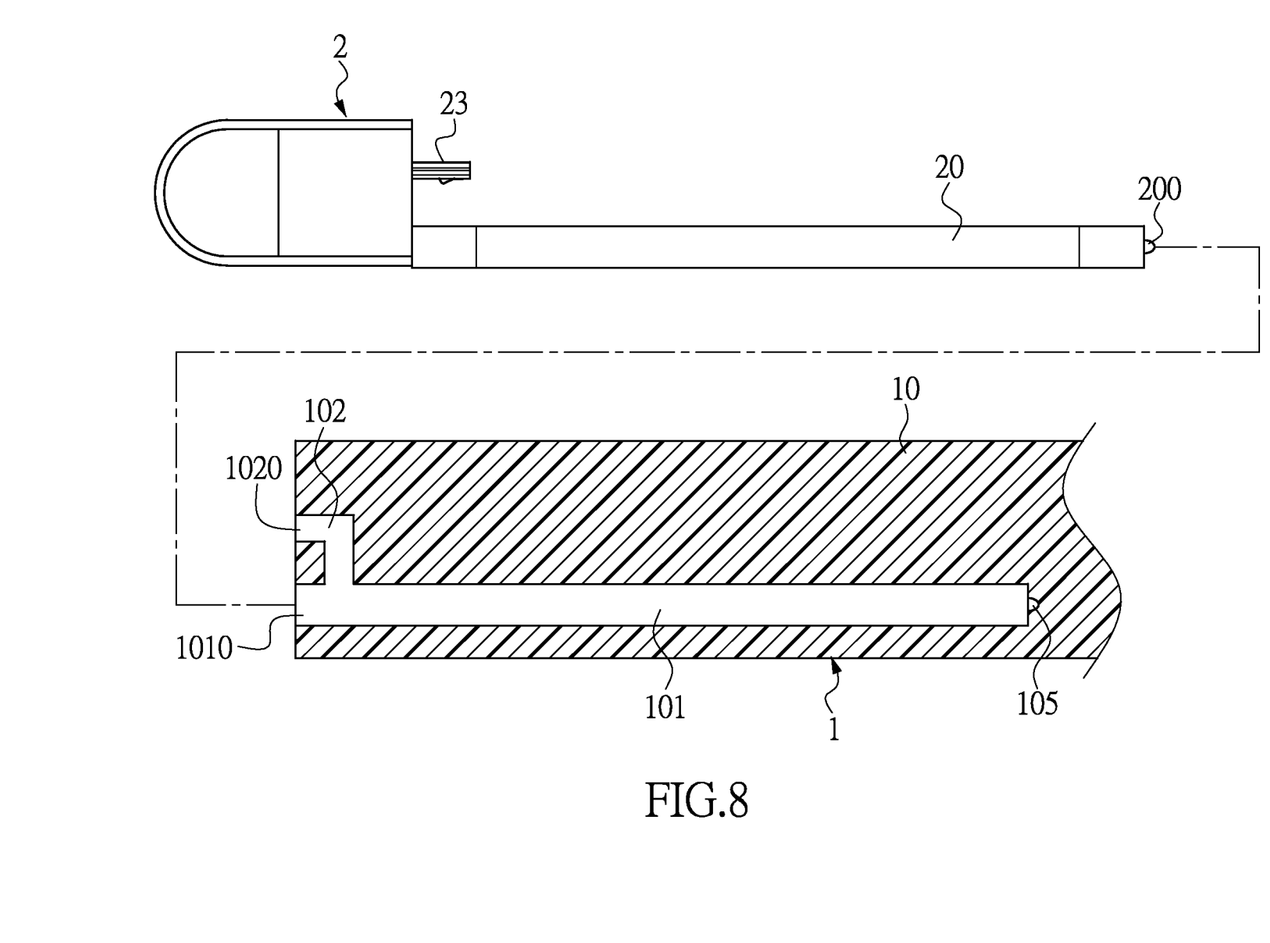
FIG. 8 shows a lateral, cross-sectional, schematic view of preparing to receive the wireless receiving module inside another type of the first outer casing according to the instant disclosure.
Figure 9:
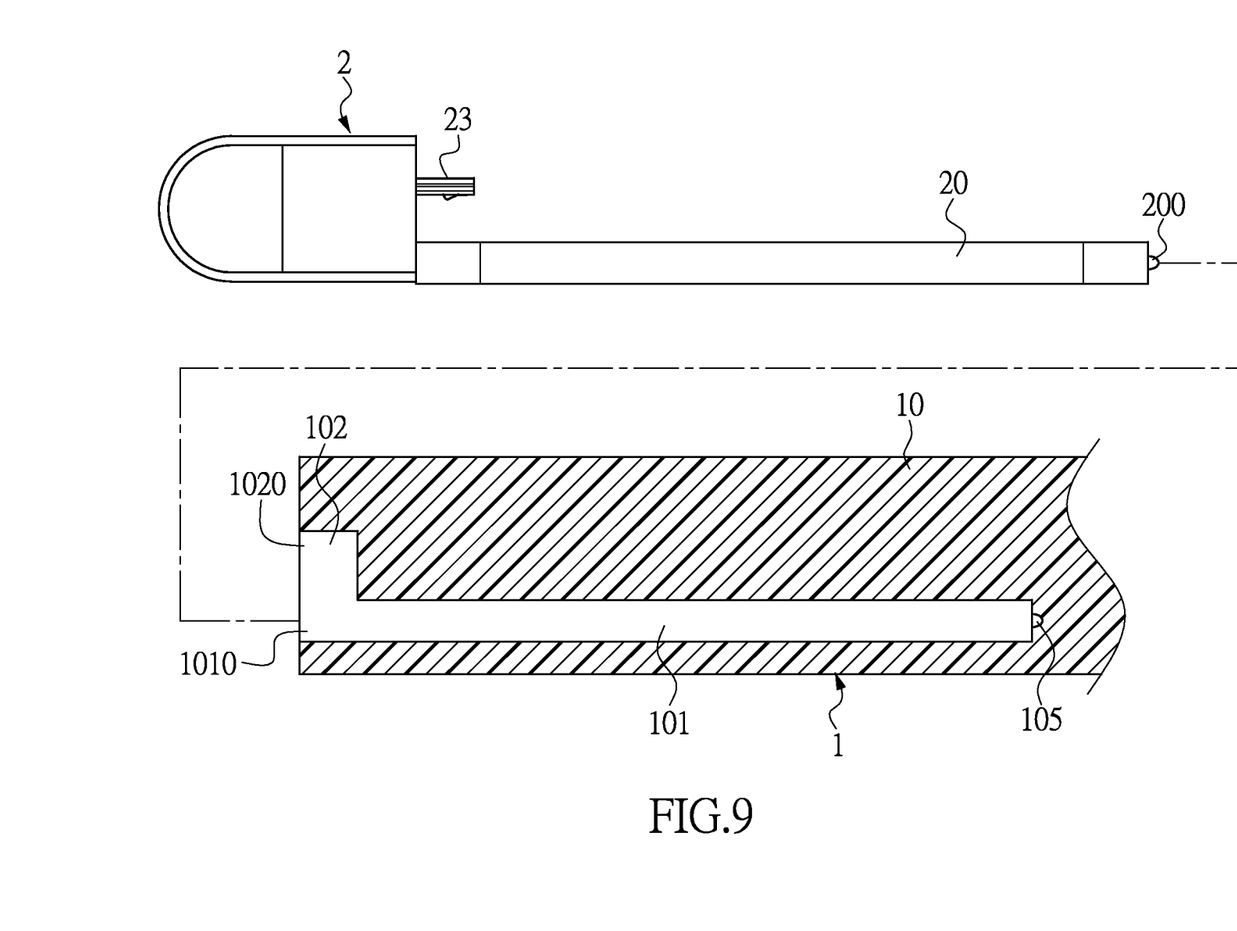
FIG. 9 shows a lateral, cross-sectional, schematic view of preparing to receive the wireless receiving module inside yet another type of the first outer casing according to the instant disclosure.

It is worth noting that referring to FIG. 7 to FIG. 9, the design of the at least one first receiving space 101 and the at least one second receiving space 102 can use the following different types. For example, referring to FIG. 7, the at least one first receiving space 101 and the at least one second receiving space 102 are separated from each other and not communicated with each other, and the first opening 1010 of the at least one first receiving space 101 and the second opening 1020 of the at least one second receiving space 102 are separated from each other and not communicated with each other. Referring to FIG. 8, the at least one first receiving space 101 and the at least one second receiving space 102 are communicated with each other, but the first opening 1010 of the at least one first receiving space 101 and the second opening 1020 of the at least one second receiving space 102 are separated from each other and not communicated with each other. Referring to FIG. 9, the at least one first receiving space 101 and the at least one second receiving space 102 are communicated with each other, and the first opening 1010 of the at least one first receiving space 101 and the second opening 1020 of the at least one second receiving space 102 are also communicated with each other.

Moreover, referring to FIG. 1, FIG. 2 and FIG. 7, the first outer casing 10 has a first retaining structure 105 (such as a retaining groove) disposed inside the at least one first receiving space 101, the second outer casing 20 has a second retaining structure 200 (such as a retaining block) corresponding to the first retaining structure 105. Whereby, when the second outer casing 20 and the at least one electrical connector 23 of the wireless receiving module 2 are respectively received inside the at least one first receiving space 101 and the at least one second receiving space 102 of the first outer casing 10, the first outer casing 10 and the at least one electrical connector 23 can be respectively retained inside the at least one first receiving space 101 and the at least one second receiving space 102 by retainably or slidably matching the first retaining structure 105 and the second retaining structure 200, for preventing the wireless receiving module 2 from being separated easily from the wireless transmitting module 1.

Figure 10:
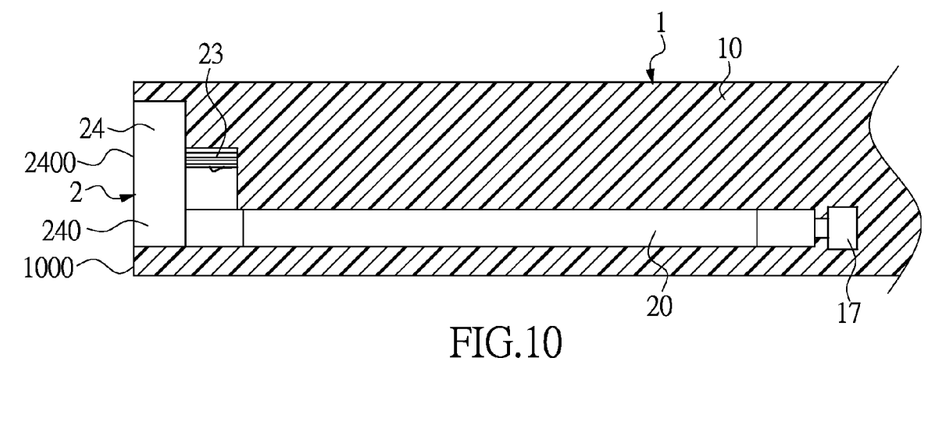
FIG. 10 shows a lateral, cross-sectional, schematic view of another wireless receiving module totally received inside another wireless transmitting module according to the instant disclosure.
Figure 11:
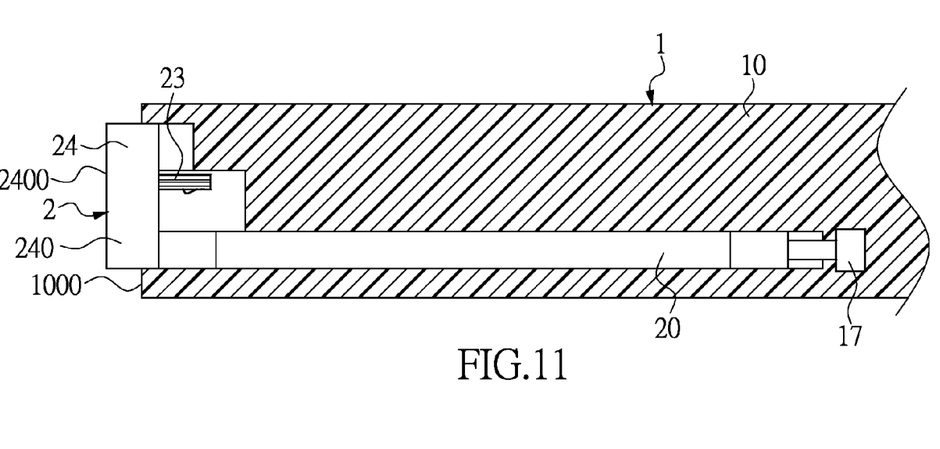
FIG. 11 shows a lateral, cross-sectional, schematic view of another wireless receiving module partially received inside another wireless transmitting module according to the instant disclosure.

It is worth mentioning that referring to FIG. 10 and FIG. 11, the wireless transmitting module 1 further includes a retractile mechanism 17 (such as a push-push mechanism) disposed inside the first outer casing 10. When the wireless receiving module 2 is received inside the wireless transmitting module 1 (as shown in FIG. 10), the wireless receiving module 2 can be totally received inside the first outer casing 10 of the wireless transmitting module 1 except an exposed lateral side 2400 of the support body 240 of the support unit 24, thus the exposed lateral side 2400 of the support body 240 can be substantially flushed with outer surface 1000 of the first outer casing 10. In addition, when the user presses the exposed lateral side 2400 of the support body 240 to push the retractile mechanism 17, one part of the exposed lateral side 2400 is exposed from the wireless transmitting module 1 (as shown in FIG. 11) through the retractile mechanism 17, thus the user can draw out the wireless receiving module 2 from the wireless transmitting module 1 easily by holding the exposed part of the support body 240.

Figure 12:
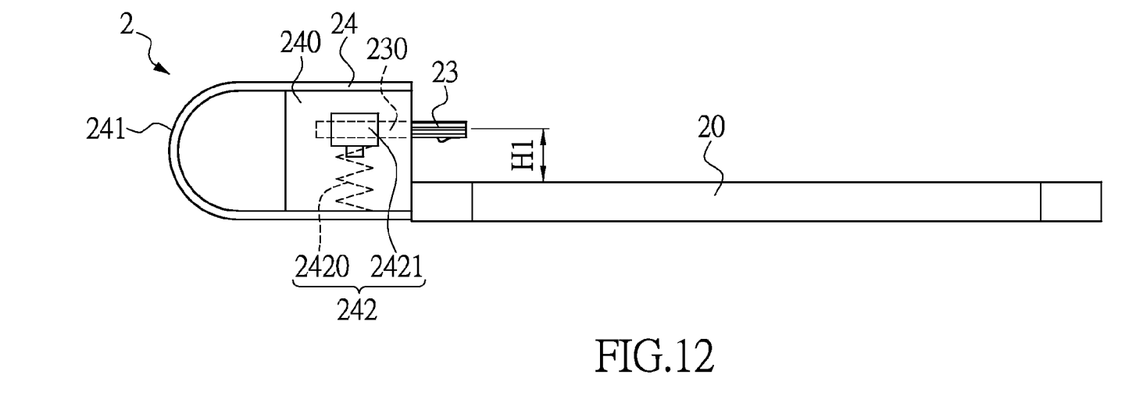
FIG. 12 shows a lateral, cross-sectional, schematic view of using the lifting and lowering shaft to adjust the height H1 of the at least one electrical connector relative to the second outer casing according to the instant disclosure.
Figure 13:
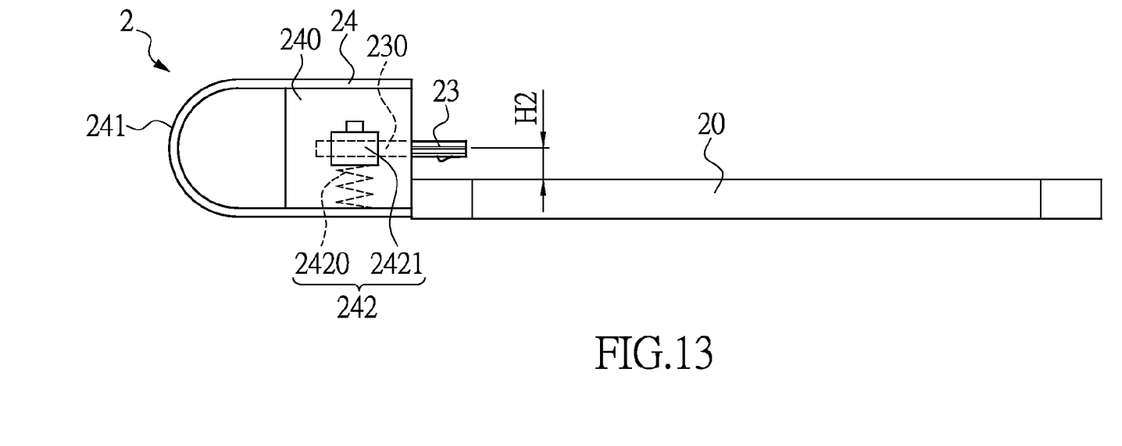
FIG. 13 shows a lateral, cross-sectional, schematic view of using the lifting and lowering shaft to adjust the height H2 of the at least one electrical connector relative to the second outer casing according to the instant disclosure.

It is worth mentioning that referring to FIG. 12 and FIG. 13, the support unit 24 has a support body 240 connected to the second outer casing 20, an inbuilt height adjusting mechanism 242 disposed inside the support body 240 for adjusting the height (H1, H2) of the at least one electrical connector 23 relative to the second outer casing 20, and a pull ring 241 connected to the support body 240 and opposite to the at least one electrical connector 23. In addition, the inbuilt height adjusting mechanism 242 includes an elastic element 2420 (such as a spring) for abutting against an embedded portion 230 of the at least one electrical connector 23 and a lifting and lowering shaft 2421 connected to the embedded portion 230 of the at least one electrical connector 23 for adjusting the compression deformation of the elastic element 2420. Furthermore, because the lifting and lowering shaft 2421 is exposed from the lateral side of the support body 240, the height H1 (as shown in FIG. 12) or the height H2 (as shown in FIG. 13) of the at least one electrical connector 23 relative to the second outer casing 20 can be adjusted easily by pushing the lifting and lowering shaft 2421 according to the height of the USB socket of different portable electronic device P, but it is merely an example and is not meant to limit the instant disclosure.

In conclusion, the aspect of the wireless charging device is increased due to the design of "the first outer casing 10 of the wireless transmitting module 1 has at least one first receiving space 101 corresponding to the second outer casing 20 and at least one second receiving space 102 corresponding to the at least one electrical connector 23" or "the wireless receiving module 2 is totally received inside the first outer casing 10 of the wireless transmitting module 1 except an exposed lateral side 2400 of the support unit 24".

The above-mentioned descriptions merely represent the preferred embodiments of the instant disclosure, without any intention or ability to limit the scope of the instant disclosure which is fully described only within the following claims. Various equivalent changes, alterations or modifications based on the claims of instant disclosure are all, consequently, viewed as being embraced by the scope of the instant disclosure.

What is claimed is:

1. A wireless charging device, comprising:
   a wireless transmitting module including a first outer casing, a power storage unit disposed inside the first outer casing, a first control circuit unit disposed inside the first outer casing and electrically connected to the power storage unit, and a wireless transmitting unit disposed inside the first outer casing and electrically connected to the first control circuit unit for generating electromagnetic fields; and
   a wireless receiving module including a second outer casing, a wireless receiving unit disposed inside the second outer casing for wirelessly receiving the electromagnetic fields generated by the wireless transmitting unit, a second control circuit unit disposed inside the second outer casing and electrically connected to the wireless receiving unit, and at least one electrical connector exposed outside the second outer casing and electrically connected between the second control circuit unit and a portable electronic device;
   wherein the first outer casing of the wireless transmitting module has at least one first receiving space corresponding to the second outer casing and at least one second receiving space corresponding to the at least one electrical connector, and the wireless receiving module includes a support unit connected to the second outer casing for supporting the at least one electrical connector.

2. The wireless charging device of claim 1, wherein the first outer casing has a placing platform for carrying the wireless receiving module and a non-slip structure opposite to the placing platform, and both the at least one first receiving space and the at least one second receiving space are formed on the same lateral side of the first outer casing, wherein the wireless transmitting module includes a transformer disposed inside the first outer casing and electrically connected to the power storage unit, a power input unit electrically connected to the transformer, and at least one power output unit electrically connected to the power storage unit.

3. The wireless charging device of claim 1, wherein the second outer casing has a first opening and a second opening, and the second outer casing is received inside the at least one first receiving space of the first outer casing through the at least one first opening, and the at least one electrical connector is received inside the at least one second receiving space of the first outer casing through the at least one second opening.

4. The wireless charging device of claim 1, wherein the support unit has a support body connected to the second outer casing for fixing the height of the at least one electrical connector relative to the second outer casing and a pull ring connected to the support body and opposite to the at least one electrical connector.

5. The wireless charging device of claim 1, wherein the support unit has a support body connected to the second outer casing, an inbuilt height adjusting mechanism disposed inside the support body for adjusting the height of the at least one electrical connector relative to the second outer casing, and a pull ring connected to the support body and opposite to the at least one electrical connector, and the inbuilt height adjusting mechanism includes an elastic element for abutting against an embedded portion of the at least one electrical connector and a lifting and lowering shaft connected to the embedded portion of the at least one electrical connector for adjusting the compression deformation of the elastic element.

6. The wireless charging device of claim 1, wherein the first outer casing has a first retaining structure disposed inside the at least one first receiving space, the second outer casing has a second retaining structure corresponding to the first retaining structure, and the first outer casing and the at least one electrical connector are respectively retained inside the at least one first receiving space and the at least one second receiving space by matching the first retaining structure and the second retaining structure.

7. A wireless charging device, comprising:
   a wireless transmitting module including a first outer casing and a wireless transmitting unit disposed inside the first outer casing for generating electromagnetic fields; and
   a wireless receiving module including a second outer casing, a wireless receiving unit disposed inside the second outer casing for wirelessly receiving the electromagnetic fields generated by the wireless transmitting unit, and at least one electrical connector exposed outside the second outer casing and electrically contacting a portable electronic device;
   wherein the first outer casing of the wireless transmitting module has at least one first receiving space for receiving the second outer casing and at least one second receiving space for receiving the at least one electrical connector;
   wherein the second outer casing has a first opening and a second opening, the second outer casing is received inside the at least one first receiving space of the first outer casing through the at least one first opening, and the at least one electrical connector is received inside the at least one second receiving space of the first outer casing through the at least one second opening.

8. The wireless charging device of claim 7, wherein the wireless receiving module includes a support unit connected to the second outer casing for supporting the at least one electrical connector, and the support unit has a support body connected to the second outer casing, an inbuilt height adjusting mechanism disposed inside the support body for adjusting the height of the at least one electrical connector relative to the second outer casing, and a pull ring connected to the support body and opposite to the at least one electrical connector, wherein the inbuilt height adjusting mechanism includes an elastic element for abutting against an embedded portion of the at least one electrical connector and a lifting and lowering shaft connected to the embedded portion of the at least one electrical connector for adjusting the compression deformation of the elastic element.

9. A wireless charging device, comprising:
 a wireless transmitting module including a first outer casing, a power storage unit disposed inside the first outer casing, a first control circuit unit disposed inside the first outer casing and electrically connected to the power storage unit, and a wireless transmitting unit disposed inside the first outer casing and electrically connected to the first control circuit unit for generating electromagnetic fields; and
 a wireless receiving module including a second outer casing, a wireless receiving unit disposed inside the second outer casing for wirelessly receiving the electromagnetic fields generated by the wireless transmitting unit, a second control circuit unit disposed inside the second outer casing and electrically connected to the wireless receiving unit, and at least one electrical connector exposed outside the second outer casing and electrically connected between the second control circuit unit and a portable electronic device;
 wherein the wireless receiving module includes a support unit connected to the second outer casing for supporting the at least one electrical connector, the wireless receiving module is totally received inside the first outer casing of the wireless transmitting module except an exposed lateral side of the support unit, and the exposed lateral side of the support unit is substantially flushed with outer surface of the first outer casing.

* * * * *